UNITED STATES PATENT OFFICE.

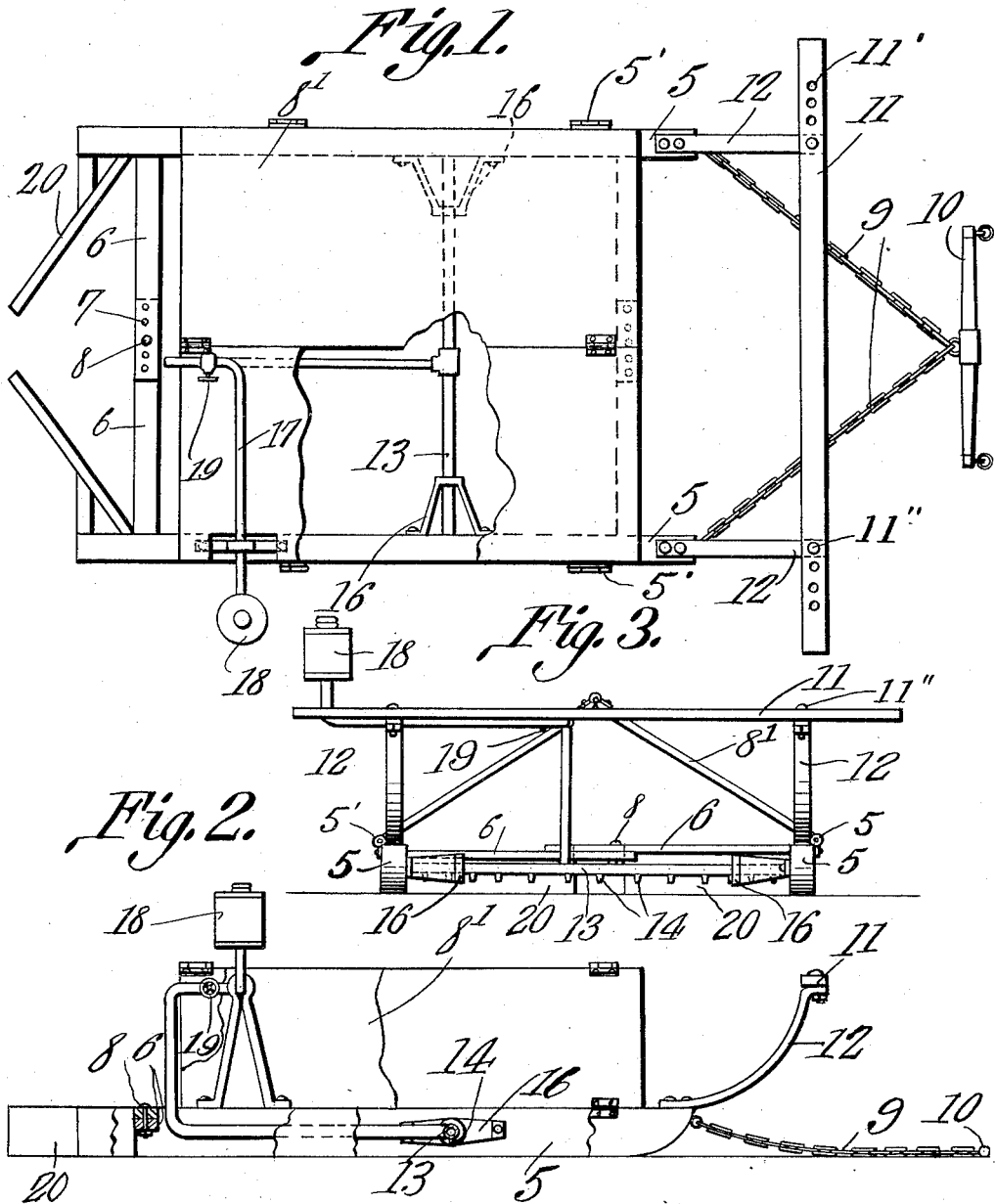

WILLIAM W. GARNER AND OWEN T. RUSH, OF MINERAL, TEXAS.

INSECT-DESTROYER.

1,007,858.   Specification of Letters Patent.   Patented Nov. 7, 1911.

Application filed August 26, 1910. Serial No. 579,075.

*To all whom it may concern:*

Be it known that we, WILLIAM W. GARNER and OWEN T. RUSH, citizens of the United States, residing at Mineral, in the county of Bee, State of Texas, have invented a new and useful Insect-Destroyer, of which the following is a specification.

It is the object of the present invention to provide an improved insect destroyer and the device of the present invention is of that class embodying a fuel supply and a burner for the purpose of destroying insects brushed from plants beside which the device is traveling.

It is one aim of the present invention to provide in an insect destroyer of this type means whereby the same may be adjusted as regards width so that it will be adapted for use between rows of plants spaced apart to a greater or less distance.

A still further object of the invention is to so construct the device that the plants between the rows of which it travels will be protected from the flames intended to destroy the insects brushed from the plants.

A still further aim of the invention is to provide, in an insect destroyer of this type, novel means for brushing the insects from the plants such means being yieldable so as not to injure the plant.

With the above and other objects in view, the invention consists in the general construction and arrangement of parts shown in the accompanying drawings, in which, Figure 1 is a top plan view of the machine embodying the present invention. Fig. 2 is a side elevation thereof, parts being broken away. Fig. 3 is an end view thereof.

The machine embodying the present invention is constructed to be drawn over a field between rows of plants which are to be cleared of insects and embodies spaced runners indicated by the numeral 5. In order to hold these runners in connected spaced relation, a beam 6 projects inwardly from each runner at the rear end thereof and the end portions of these beams are overlapped. When so overlapped, one or another of a series of openings 7 in the end of one beam will register with one or another of a number of openings in the corresponding end of the other beam. With the ends of the beams overlapped in the manner stated and the openings 7 in registration, a bolt 8 is secured through the openings and serves to rigidly connect the beams. It will be readily understood from the above that by removing the bolt 8, the beams may be adjusted to space the runners 5 to the desired distance apart depending upon the width of the space between the rows of plants to be relieved of insects by the destroyer.

For a purpose to be presently explained, the device is covered by a roof comprising roof sections 8′ which are hinged at their upper edges to each other and at their lower edges are hinged as at 5′, one to each of the runners 5. Owing to the fact that these roof sections are hingedly connected to each other at their upper edges, the runners 5 may be adjusted as above stated without consideration being given to the roof sections.

In order that the device may be drawn over the field, draft chains or other suitable draft connections 9 are connected at their rear ends to the forward ends of the runners 5 and at the forward ends to a swingle or double tree 10. The chains are of such length that this draft tree, when a pull is being exerted thereon, will lie in advance of the sweep bar of the device. This sweep bar 11 is of a length greater than the greatest width of the remainder of the device and is supported in proper elevated position by means of resilient bar metal standards 12 which are bowed in such manner as to readily yield when the ends of the sweep bar 11 come into engagement with plants between the rows of which the device is being drawn. It will thus be seen that as the device is drawn over the field between rows of plants, the end portions of the sweep bar will knock against the plants of the rows and the insects upon the plants will be shaken therefrom. The bar 11 is provided with a series of apertures 11′ which are adapted to be engaged by bolts 11″ thereby to provide a transverse adjusting means between the bar 11 and the standard 12, so that runners 5 in the forward end thereof may be moved to or from each other and held at such adjustment. Also it will be understood owing to the fact that the standards 12 for supporting the sweep bar are not only resilient but are so bowed as to readily yield, the contact of the ends of the sweep bar with the plants will not injure the plants but, on the other hand, a vibratory movement will be imparted to the sweep bar each time one or both of its ends engages with a plant and this vibratory movement renders the sweep more effective for the purpose for which it is designed.

As before stated, it is intended that the insects shall first be brushed from the plants and then destroyed by flames and the means for destroying the insects in this manner embodies a burner tube indicated by the numeral 13 and provided with a number of downwardly projecting jets 14. This tube is suported at one end of a fuel supply pipe 15 and is positioned transversely of the device, between the front and rear sets of beams and beneath the roof 8'. The fuel supply pipe 15 is slidably supported at its ends by brackets 16 upon the sills 5. The supply pipe 15 extends rearwardly to a point immediately in advance of the rear set of beams 6, thence upwardly, and then partly across and forwardly above the roof sections. The pipe is finally turned to extend laterally as at 17 and supports a fuel tank 18 which tank contains coal oil or gasolene which is to be supplied to the burner tube. To regulate this supply, a valve 19 is interposed in the pipe 15 at any desired point.

As a means for sweeping the insects away from the roots of the plants, after they are destroyed, and also as a means for sweeping away from the vicinity of the plants any ignited leaves or twigs, shovel boards 20 are arranged one at the rear end of each runner 5, these boards projecting each rearwardly inwardly at an angle from its respective runner and the two boards having their rear ends spaced to a degree sufficient to prevent accumulation of the insects and debris between the runners of the machine.

From the foregoing description of the invention it will be seen that as the machine is drawn forwardly between rows of plants to be cleaned of insects, the ends of the sweep board 11 will brush against the plants and the vibratory movement imparted to the board by reason of such contact will result in the plant being so shaken as to cause any insects thereon to drop therefrom onto the ground. The fuel issuing from the jets 14 then having been ignited, numerous jets of flame will impinge against the ground surface and the insects which have fallen upon the surface will be destroyed. Then, as the machine progresses, the shovel boards 20 will scrape over the surface of the ground and the destroyed insects will be swept toward the middle of the space between the rows of plants and may be conveniently removed at some future time or allowed to remain.

What is claimed is:—

1. In an insect destroyer, a frame including spaced runners, beams adjustably connecting the runners, a roof comprising sections connected at their lower edges one to each runner and hinged together at their upper edges, a fuel supply tank, a burner pipe slidably supported at its ends upon the runners, and a fuel supply pipe leading from the fuel supply tank to the burner pipe.

2. In an insect destroyer, a frame including spaced runners, beams adjustably connecting the runners and a roof comprising sections connected at their lower edges one to each runner and hinged together at their upper edges.

In testimony that we claim the foregoing as our own, we have hereto affixed our signatures in the presence of two witnesses.

WILLIAM W. GARNER.
OWEN T. RUSH.

Witnesses:
W. F. MARSHALL,
R. C. HARRIS.

---

Copies of this patent may be obtained for five cents each, by addressing the "Commissioner of Patents, Washington, D. C."